(12) United States Patent
Williamson

(10) Patent No.: US 9,366,369 B2
(45) Date of Patent: Jun. 14, 2016

(54) FLANGE ASSEMBLY

(71) Applicant: Mark Williamson, Westbury (GB)

(72) Inventor: Mark Williamson, Westbury (GB)

(73) Assignee: KLAW PRODUCTS LIMITED (GB)

( * ) Notice: Subject to any disclaimer, the term of this patent is extended or adjusted under 35 U.S.C. 154(b) by 632 days.

(21) Appl. No.: 13/683,728

(22) Filed: Nov. 21, 2012

(65) Prior Publication Data

US 2013/0147190 A1    Jun. 13, 2013

(30) Foreign Application Priority Data

Nov. 23, 2011    (GB) .................................. 1120232.2

(51) Int. Cl.
*F16L 23/18*    (2006.01)
*F16L 23/16*    (2006.01)

(52) U.S. Cl.
CPC    *F16L 23/16* (2013.01); *F16L 23/18* (2013.01)

(58) Field of Classification Search
CPC .................................. F16L 23/18; F16L 23/16
USPC ............ 277/609, 616; 285/363, 364, 368, 37, 285/34

See application file for complete search history.

(56) References Cited

U.S. PATENT DOCUMENTS

| | | | |
|---|---|---|---|
| 2,462,762 A | | 2/1949 | Nardin |
| 4,168,853 A | * | 9/1979 | Ahlstone ....................... 285/336 |
| 4,192,515 A | | 3/1980 | Smith |
| 5,149,143 A | * | 9/1992 | Howell ........................... 285/18 |
| 5,409,270 A | | 4/1995 | Shinohara et al. |
| 5,904,381 A | | 5/1999 | Ohmi et al. |

OTHER PUBLICATIONS

UK Search Report relating to GB Application No. 1120232.2, dated May 3, 2012.

* cited by examiner

*Primary Examiner* — Michael P Ferguson
*Assistant Examiner* — Jay R Ripley
(74) *Attorney, Agent, or Firm* — Wolf, Greenfield & Sacks, P.C.

(57)    ABSTRACT

A flange assembly (10 comprising a flange (12) in the form of a disk shaped rim formed on a pipe section (14) for connection to a hose or pipe. The pipe section (14) defines a hollow bore (16) through which flowable material may flow and the flange (12) defines a contact face (18) for engagement, in use, with an opposing flange. The flange (12) defines a gasket seat (20) about an opening of the bore (16) to receive a gasket (22) and the flange assembly (10) further includes a gasket clamp (24*a*,24*b*) to releasably retain the gasket (22) in position on the gasket seat (20).

11 Claims, 4 Drawing Sheets

FLANGE ASSEMBLY

CROSS REFERENCE TO RELATED APPLICATIONS

The present application contains subject matter related to that disclosed in GB Priority Patent Application GB 1120232.2 filed in the GB Patent Office on Nov. 23, 2011 the entire contents of which is hereby incorporated by reference.

BACKGROUND

The invention relates to a flange assembly for use in the creation of a connection between a pair of pipes or hoses.

SUMMARY

According to an aspect of the invention there is provided a flange assembly comprising a flange in the form of a disk shaped rim formed on a pipe section for connection to a hose or pipe, the pipe section defining a hollow bore through which flowable material may flow and the flange defining a contact face for engagement, in use, with an opposing flange, the flange defining a gasket seat about an opening of the bore to receive a gasket and the flange assembly further including a gasket clamp to releasably retain the gasket in position on the gasket seat.

The provision of a gasket clamp on the contact face of the flange allows a gasket to be held in position on the gasket seat during the alignment and engagement of opposing flanges of a pair of pipes or hoses during connection of the pipes or hoses.

This simplifies the alignment and engagement of opposing flanges and reduces the risk of injury that might otherwise occur through the trapping of hands or fingers if the gasket is held in position by hand during alignment and engagement of the opposing flanges.

In preferred embodiments of the invention the gasket clamp may include first and second opposing gasket clamp members mounted on the contact face of the flange, the first gasket clamp member being fixed relative to the contact face of the flange and the second gasket clamp member including an adjustment mechanism to facilitate radial movement of the second gasket clamp member relative to the contact face of the flange, towards and away from the gasket seat.

This arrangement allows easy insertion and removal of the gasket and thereby facilitates easy replacement of the gasket.

In such embodiments each of the first and second gasket clamp members preferably defines a dovetail face to engage against an edge of the gasket and urge the gasket against the gasket seat, radial movement of the second gasket clamp member moving the dovetail face provided on the second gasket clamp member into and out of engagement with the gasket.

The provision of dovetail faces on the first and second gasket clamp members further improves the retention of a gasket in position in use, the dovetail faces acting to urge the gasket against the gasket seat and thereby ensuring a complete seal between the contact face of the flange and the gasket.

In order to facilitate radial movement of the second gasket clamp member, the adjustment mechanism may include an adjustment screw that is threadedly engaged in an aperture formed in a side face of the flange and drivingly connected to the second gasket clamp member to drive radial movement of the second gasket clamp member relative to the contact face of the flange, towards and away from the gasket seat.

Location of the adjustment screw on a side face of the flange reduces the risk of the adjustment mechanism becoming damaged in use during the alignment and engagement of opposing flanges and ensures that the adjustment mechanism cannot interfere and prevent alignment and engagement of the opposing flanges.

In such embodiments, an end of the adjustment screw may protrude into an internal cavity formed in the flange, the end of the adjustment screw being coupled to the second gasket clamp by means of a link member extending through the cavity and an elongated aperture in the contact face of the flange, between the end of the adjustment screw and the second gasket clamp, to translate radial movement of the adjustment screw relative to the flange into radial movement of the second gasket clamp relative to the contact face of the flange, towards and away from the gasket seat.

This arrangement allows direct driving engagement between the adjustment screw and the second gasket clamp member to facilitate adjustment and movement of the second gasket clamp member relative to the contact face of the flange.

So as to allow connection of the flange to an opposing flange, the flange preferably includes two or more through-holes to receive bolts in use to secure the contact face of the flange in engagement with an opposing flange.

In embodiments of the invention the pipe section may be connected to an end connection of a pipe or hose.

It is envisaged that the flange assembly could be used with any existing flange or pipe arrangement and the flange member may, for example, be provided in the form of a short spool flange, a slip on flange, a weld neck flange or a studded flange.

In embodiments of the invention the flange assembly may further include a gasket releasably retained in position on the gasket seat by means of the gasket clamp.

BRIEF DESCRIPTION OF THE DRAWINGS

An embodiment of the invention will now be described, by way of a non-limiting example, with reference to the accompanying drawings in which.

DETAILED DESCRIPTION

Figure 1:
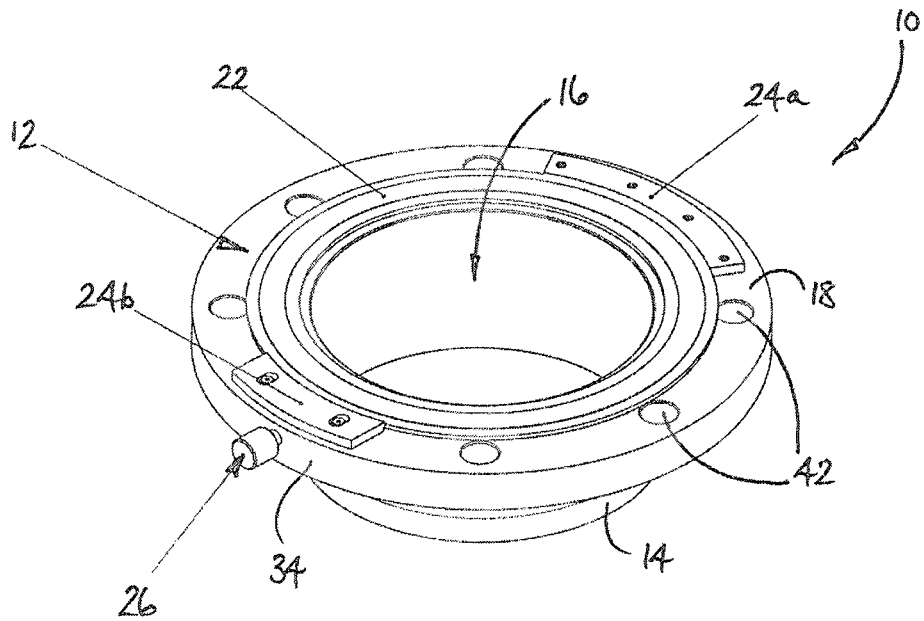
FIG. 1 shows a side perspective view of a flange assembly according to an embodiment of the invention.
Figure 2:
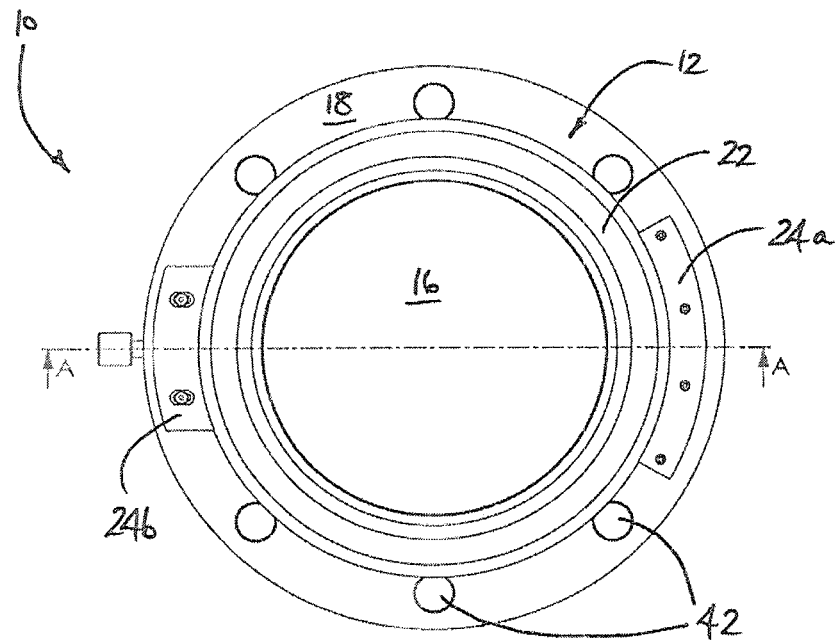
FIG. 2 shows a plan view from above of the flange assembly shown in FIG. 1.

A flange assembly 10 according to an embodiment of the invention is shown in FIG. 1.

The flange assembly 10 includes a flange 12 in the form of a disk shaped rim formed on a pipe section 14 for connection to a hose or pipe (not shown). The pipe section 14 defines a hollow bore 16 through which flowable material may flow and the flange defines a contact face 18 for engagement, in use, with an opposing flange (not shown).

The flange 12 defines a gasket seat 20 (FIG. 3) about an opening of the bore 16 to receive, in use, a gasket 22 and the flange assembly 10 further includes a gasket clamp to releasably retain the gasket 22 in position on the gasket seat 20.

In the embodiment shown in FIG. 1 the gasket clamp includes first and second opposing gasket clamp members 24a,24b mounted on the contact face 18 of the flange 12. The first and second gasket clamp members 24a,24b are located on opposite sides of the opening of the bore 16 and the first gasket clamp member 24a is fixed relative to the contact face 18 of the flange 12. The second gasket clamp member 24b however includes an adjustment mechanism 26 to facilitate movement of the second gasket clamp 24b relative to the contact face 18 of the flange 12, towards and away from the gasket seat 20 and the opening of the bore 16.

Figure 3:
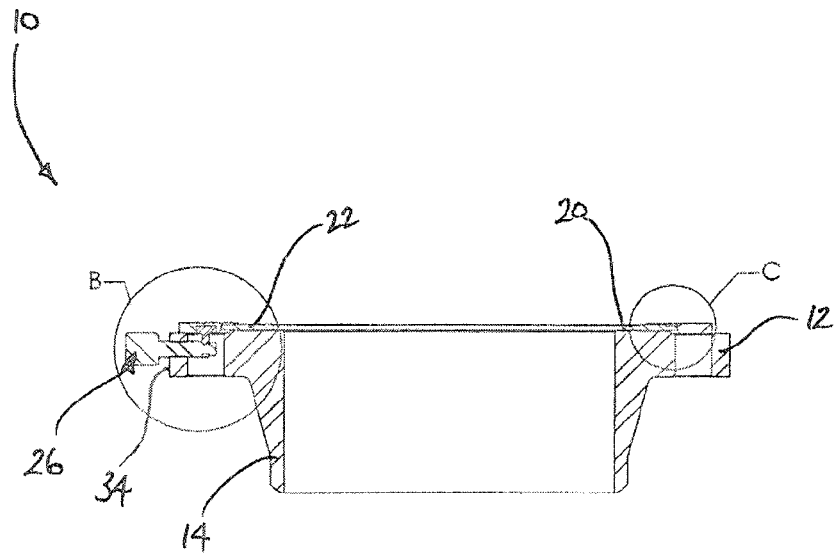
FIG. 3 shows a cross-sectional view along the line A-A of the flange assembly shown in FIG. 2.
Figure 4A:
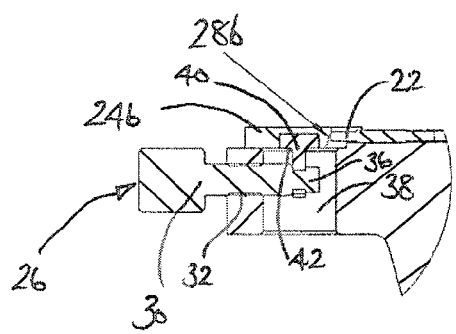
FIGS. 4*a* and 4*b* show exploded details of elements B and C identified in FIG. 3.
Figure 4B:
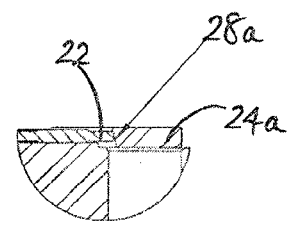

Referring to FIGS. 3, 4a and 4b, each of the first and second gasket clamp members 24a,24b defines a dovetail face 28a, 28b to engage against an edge of the gasket 22. The downward slope of each dovetail face 28a,28b means that the engagement between each dovetail face 28a,28b and the gasket 22 acts to urge the gasket 22 against the gasket seat 20.

It is will be appreciated that radial movement of the second gasket clamp member 24b will result in movement of the dovetail face 28b provided on the second gasket clamp member 24b into and out of engagement with the gasket 22, thereby allowing easy replacement of the gasket 22 when necessary.

In the embodiment shown in FIG. 1 the adjustment mechanism 26 includes an adjustment screw 30 that is threadedly engaged in an aperture 32 formed in a side face 34 of the flange 12 and drivingly connected to the second gasket clamp member 24b to drive radial movement of the second gasket clamp member 24b relative to the contact face 18 of the flange 12, towards and away from the gasket seat 20.

Referring to FIG. 4a it can be seen that an end 36 of the adjustment screw 30 protrudes into an internal cavity 38 formed in the flange 12. In the cavity 38 the end 36 of the adjustment screw 30 is coupled to the second gasket clamp member 24b by means of a link member 40 extending through the cavity 38 and an elongated aperture 42 in the contact face 18 of the flange 12, between the end 36 of the adjustment screw 30 and the second gasket clamp 24b. This connection acts to translate radial movement of the adjustment screw 30 relative to the flange 12 into radial movement of the second gasket clamp relative to the contact face 18 of the flange 12, towards and away from the gasket seat 20.

Figure 5:
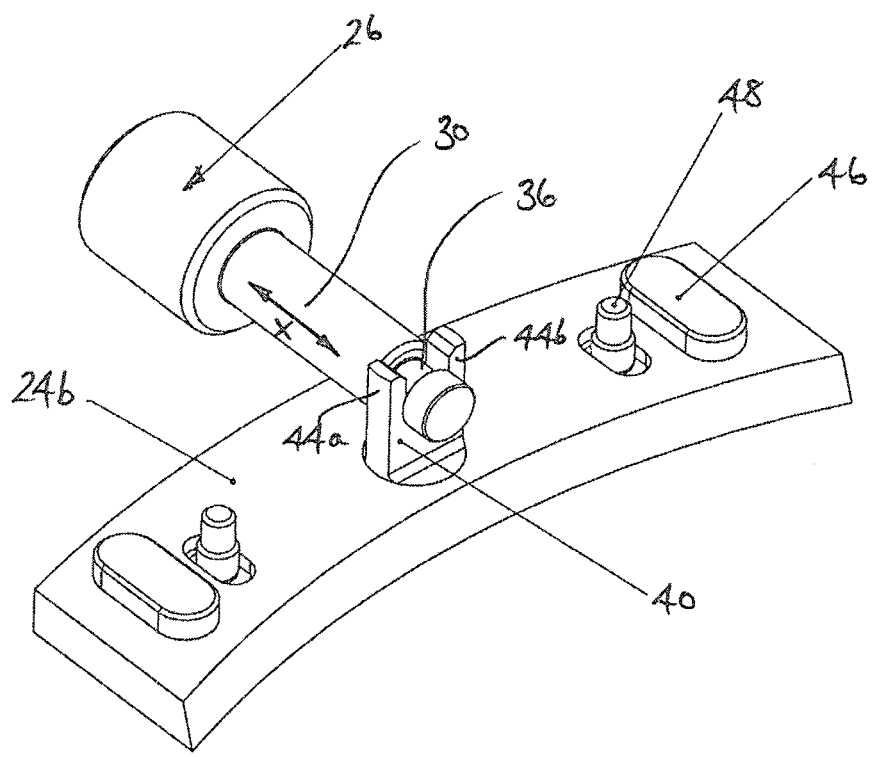
FIG. 5 illustrates the engagement between a link member extending from a second gasket clamp member and an adjustment screw of the flange assembly shown in FIG. 3.

The engagement between the end 36 of the adjustment screw 30 and the link member 40 is shown in FIG. 5. As shown in FIG. 5, the link member 40 is fixedly attached at one end to the second gasket clamp member 24b and at its other ends defines a pair of opposed limbs 44a,44b. The end 36 of the adjustment screw 30 is received between the opposed limbs 44a,44b, the opposed limbs 44a,44b being received within an annular recess 46 formed about the circumference of the end 36 of the adjustment screw 30, thereby allowing the end 36 of the adjustment screw 30 to rotate relative to the opposed limbs 44a,44b but preventing longitudinal movement of the adjustment screw 30 relative to the opposed limbs 44a,44b in the direction of arrow X.

It will be appreciated that, in use, rotation of the adjustment screw 30 causes movement into or out of the aperture 32 formed in the flange 12 by virtue of the screw-threaded engagement between the adjustment screw 30 and the aperture 32. It will also be appreciated that the nature of the engagement between the end 36 of the adjustment screw 30 and the opposed limbs 44a,44b of the link member 40 means that on rotation of the adjustment screw 30, the second gasket clamp member 24b will be driven towards or away from the gasket seat 20, in the direction of arrow X, depending on the direction of rotation of the adjustment screw 30.

Referring to FIG. 5, it can also be seen that the second gasket clamp member 24b includes a pair of tenons 46, which are received in corresponding elongated apertures (not shown) in the contact face 18 of the flange 12 to guide movement of the second gasket clamp member 24b.

In addition, a pair of adjustable screws 48 are also provided, which protrude in to corresponding elongated apertures (not shown) in the contact face 18 of the flange 12 so as to form adjustable stops which, in use, limit movement of the second gasket clamp member 24b relative to the contact face 18 of the flange 12. The relative positions of these screws 48 may be adjusted to adjust the range of movement of the second gasket clamp member 24b as necessary in order to ensure firm engagement with the gasket 22.

So as to facilitate connection of the flange 12 to an opposing flange (not shown), the flange 12 includes a plurality of through-holes 42 to receive bolts, in use, to secure the contact face 18 of the flange 12 in engagement with an opposing flange.

In embodiments of the invention the pipe section 14 may be connected to an end connection of a pipe or hose.

It is envisaged that the flange assembly could be used with any existing flange or pipe arrangement and the flange member may, for example, be provided in the form of a short spool flange, a slip on flange, a weld neck flange or a studded flange.

The flange assembly 10 provides a convenient mechanism for holding a gasket 22 in position on the gasket seat 20 during alignment of the contact face 18 of the flange 12 with an opposing flange. This is particularly advantageous in circumstances where the flange assembly 10 and the opposing flange are connected to opposing ends of a pipe or hose. In the absence of the first and second gasket clamp members 24a, 24b the gasket 22 must be held in place by hand, further complicating the alignment and engagement of the flange 12 with an opposing flange, and increasing the risk of injury in the event a hand or fingers become trapped between the flange 12 and the opposing flange.

Figure 6:
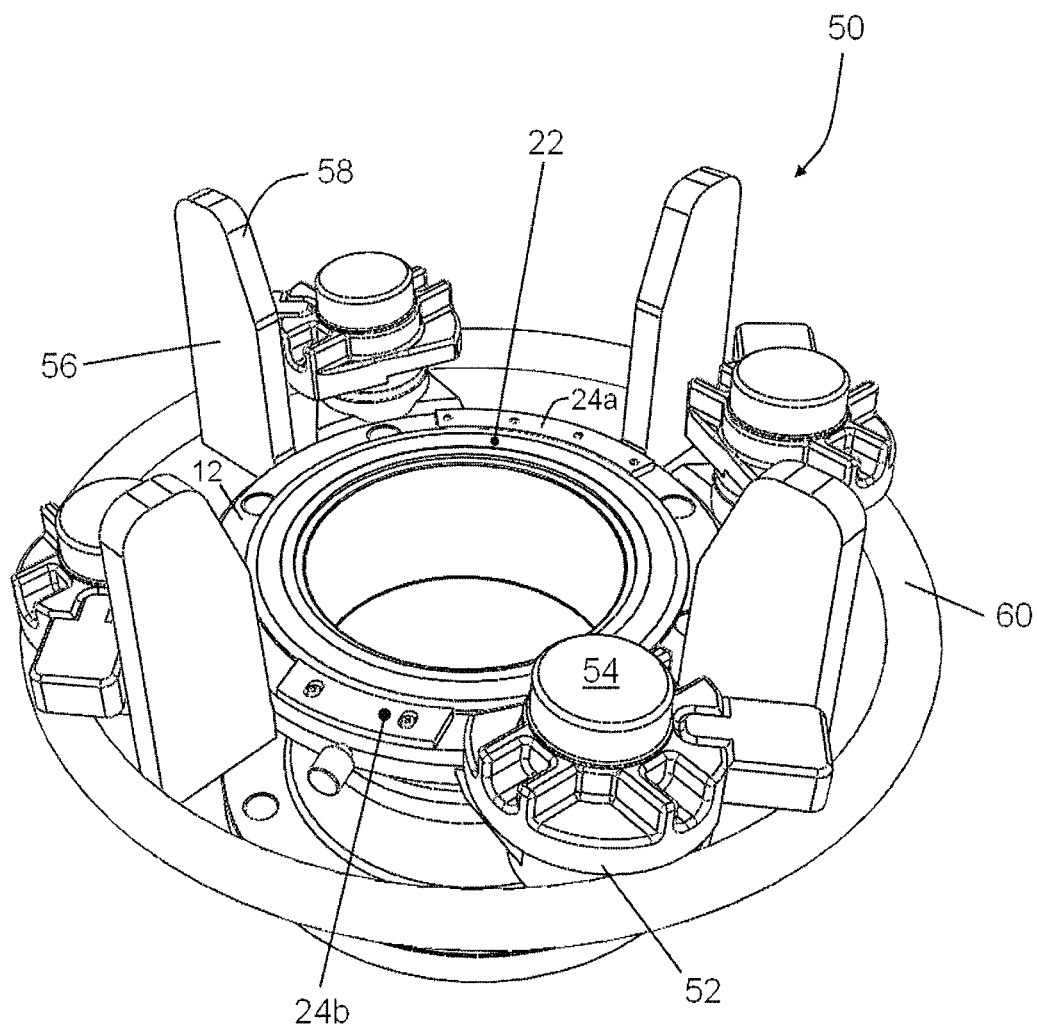
FIG. 6 illustrates the flange assembly shown in FIG. 1 being used in combination with a flange camlock coupler.

The flange assembly 10 is particularly advantageous in use with a flange camlock coupler 50, such as that shown in FIG. 6. The flange camlock coupler 50 includes a plurality of cam members 52, which may be adjusted to contact and engage the side face 34 of the flange 12 by means of adjustment bolts 54 and thereby secured the flange camlock coupler 50 in position relative to the flange assembly.

In the arrangement shown in FIG. 6, the flange camlock coupler 50 includes four cam members 52. It will be appreciated that in other embodiments the number of cam members 52 may be more or less.

A guide member 56 is mounted relative to each of the cam members 52, each guide extending generally perpendicularly relative to the contact face 18 of the flange 12 and an uppermost end of each guide member 56 reducing in width so as to define a tapered nose section 58.

In use, the cam members 52 lock the guide members 56 in position relative to the flange assembly 10 so that an opposing flange (not shown) may then be brought into engagement with the contact face 18 of the flange 12, the guide members 56 serving to guide the flange 12 and the opposing flange into alignment readily with minimum input from an operator and thereby reducing the risk of injury.

It will be appreciated that during this alignment, the first and second gasket clamp members 24a,24b retain a gasket 22 in position on the gasket seat 20 of the flange 12 and ensure that a complete seal is formed between the flange 12 and the opposing flange once they are aligned.

A further advantage of the flange camlock coupler 50 is that the guide members 56 maintain the alignment and engagement between the flange 12 and an opposing flange whilst bolts are inserted through the through-holes formed in the flange 12 and the opposing flange to secure the connection.

Referring to FIG. 6, a protection ring 60 is also shown, which serves to protect the cam members 52 and the remaining mechanism of the flange camlock coupler 50 during alignment of opposing ends of two pipes. It will be appreciated that such pipes may be significant in size and weight, hence the desire to minimise the risk of damage caused by collisions between component parts and damage caused by trapping hands or fingers therebetween.

What is claimed is:

1. A flange assembly comprising:
   a flange in the form of a disk shaped rim formed on a pipe section for connection to a hose or pipe, the pipe section defining a hollow bore through which flowable material may flow and the flange defining a contact face for engagement, in use, with an opposing flange, the flange defining a gasket seat about an opening of the bore to receive a gasket; and
   a gasket clamp to releasably retain the gasket in position on the gasket seat,
   wherein:
     the gasket clamp comprises first and second opposing gasket clamp members mounted on the contact face of the flange, the first gasket clamp member being fixed relative to the contact face of the flange; and
     the second gasket clamp member comprises an adjustment mechanism to facilitate radial movement of the second gasket clamp member relative to the contact face of the flange, towards and away from the gasket seat; and
     each of the first and second gasket clamp members defines a dovetail face to engage against an edge of the gasket and urge the gasket against the gasket seat, radial movement of the second gasket clamp member moving the dovetail face provided on the second gasket clamp member into and out of engagement with the gasket; and
     the adjustment mechanism includes an adjustment screw that is threadedly engaged in an aperture formed in a side face of the flange and drivingly connected to the second gasket clamp member to drive radial movement of the second gasket clamp member relative to the contact face of the flange, towards and away from the gasket seat; and
     an end of the adjustment screw protrudes into an internal cavity formed in the flange, the end of the adjustment screw being coupled to the second gasket clamp member by means of a link member extending through the cavity and an elongated aperture in the contact face of the flange, between the end of the adjustment screw and the second gasket clamp member, to translate radial movement of the adjustment screw relative to the flange into radial movement of the second gasket clamp member relative to the contact face of the flange, towards and away from the gasket seat.

2. A flange assembly according to claim 1 wherein the flange includes two or more through-holes to receive bolts in use to secure the contact face of the flange in engagement with an opposing flange.

3. A flange assembly according to claim 1 wherein the pipe section is connected to an end connection of a pipe or hose.

4. A flange assembly according to claim 1 wherein the flange member is a short spool flange, a slip on flange, a weld neck flange or a studded flange.

5. A flange assembly according to claim 1 further including a gasket releasably retained in position on the gasket seat by means of the gasket clamp.

6. A flange assembly comprising:
   a flange in the form of a disk shaped rim formed on a pipe section for connection to a hose or pipe, the pipe section defining a hollow bore through which flowable material may flow and the flange defining a contact face for engagement, in use, with an opposing flange, the flange defining a gasket seat about an opening of the bore to receive a gasket; and
   a gasket clamp to releasably retain the gasket in position on the gasket seat,
   wherein:
     the gasket clamp comprises first and second opposing gasket clamp members mounted on the contact face of the flange, the first gasket clamp member being fixed relative to the contact face of the flange; and
     the second gasket clamp member comprises an adjustment mechanism to facilitate radial movement of the second gasket clamp member relative to the contact face of the flange, towards and away from the gasket seat,
     the adjustment mechanism includes an adjustment screw that is threadedly engaged in an aperture formed in a side face of the flange and drivingly connected to the second gasket clamp member to drive radial movement of the second gasket clamp member relative to the contact face of the flange, towards and away from the gasket seat; and
     an end of the adjustment screw protrudes into an internal cavity formed in the flange, the end of the adjustment screw being coupled to the second gasket clamp member by means of a link member extending through the cavity and an elongated aperture in the contact face of the flange, between the end of the adjustment screw and the second gasket clamp member, to translate radial movement of the adjustment screw relative to the flange into radial movement of the second gasket clamp member relative to the contact face of the flange, towards and away from the gasket seat.

7. A flange assembly according to claim 6, wherein each of the first and second gasket clamp members defines a dovetail face to engage against an edge of the gasket and urge the gasket against the gasket seat, radial movement of the second gasket clamp member moving the dovetail face provided on the second gasket clamp member into and out of engagement with the gasket.

8. A flange assembly according to claim 6 wherein the flange includes two or more through-holes to receive bolts in use to secure the contact face of the flange in engagement with an opposing flange.

9. A flange assembly according to claim 6 wherein the pipe section is connected to an end connection of a pipe or hose.

10. A flange assembly according to claim 6 wherein the flange member is a short spool flange, a slip on flange, a weld neck flange or a studded flange.

11. A flange assembly according to claim 6 further including a gasket releasably retained in position on the gasket seat by means of the gasket clamp.

* * * * *